(12) United States Patent
Hiroshima et al.

(10) Patent No.: US 7,496,089 B2
(45) Date of Patent: Feb. 24, 2009

(54) NETWORK, PRIVATE BRANCH EXCHANGE, AND PBX ADDITIONAL SERVICE STARTING METHOD

(75) Inventors: Takanori Hiroshima, Tokyo (JP); Minako Takai, Tokyo (JP)

(73) Assignee: NEC Corporation, Tokyo (JP)

( * ) Notice: Subject to any disclaimer, the term of this patent is extended or adjusted under 35 U.S.C. 154(b) by 679 days.

(21) Appl. No.: 10/968,151

(22) Filed: Oct. 20, 2004

(65) Prior Publication Data

US 2005/0083948 A1    Apr. 21, 2005

(30) Foreign Application Priority Data

Oct. 21, 2003    (JP) ............... 2003-360130

(51) Int. Cl.
H04L 12/66    (2006.01)
(52) U.S. Cl. ..................... 370/353; 370/401
(58) Field of Classification Search .......... None
See application file for complete search history.

(56) References Cited

U.S. PATENT DOCUMENTS

| | | | |
|---|---|---|---|
| 6,615,236 B2 | 9/2003 | Donovan et al. | |
| 6,625,141 B1 | 9/2003 | Glitho et al. | |
| 6,643,291 B1 | 11/2003 | Yoshihara et al. | |
| 6,993,360 B2 * | 1/2006 | Plahte et al. | 455/555 |
| 7,123,707 B1 * | 10/2006 | Hiri et al. | 379/215.01 |
| 7,180,984 B1 * | 2/2007 | Samarasinghe | 379/88.13 |
| 2001/0026545 A1 | 10/2001 | Matsumoto et al. | |

FOREIGN PATENT DOCUMENTS

| | | |
|---|---|---|
| EP | 1 311 103 A3 | 11/2004 |
| GB | 2 381 995 A | 5/2003 |
| JP | 06-311549 | 11/1994 |
| JP | 11-331371 | 11/1999 |
| JP | 2001-285476 | 10/2001 |
| JP | 2002-152224 | 5/2002 |
| JP | 2003-502945 A | 1/2003 |
| JP | 2003-517764 A | 5/2003 |
| JP | 2003-209261 | 7/2003 |
| WO | WO-98/58475 | 12/1998 |

OTHER PUBLICATIONS

J. Rosenberg et al., "SIP: Session Initiation Protocol," Standards Track, 2002, The Internet Society, pp. 1, 8-34.

(Continued)

Primary Examiner—Wing F Chan
Assistant Examiner—Eunsook Choi
(74) Attorney, Agent, or Firm—Foley & Lardner LLP

(57) ABSTRACT

There is disclosed a private branch exchange in which an SIP terminal is capable of receiving great variety of services provided by the private branch exchange without upgrading version of software of the SIP terminal itself. A standard SIP protocol control module 17 and an expanded SIP protocol control module 18 are disposed for SIP corresponding terminals, convert signals from an SIP system protocol corresponding terminal into signals of a protocol inside an IP-PBX 1 to transmit the signals to a PBX basic connection process providing module 12, and convert signals from the PBX basic connection process providing module 12 into signals of an SIP system protocol to transmit the signals to the SIP system protocol corresponding terminal. A PBX additional service providing module 11 and the PBX basic connection process providing module 12 provide additional services in response to an hooking operation from the SIP corresponding terminal or an input of a number for starting the service.

17 Claims, 14 Drawing Sheets

OTHER PUBLICATIONS

B2BUA: Enabling Class 5 Capabilities in SIP Designs, www.com-msdesign.com/printableArticle/;jessionid=OWFEQBYQHXCDIQSNDBGCKHSCJUMEKJVN?articleID=16502048 Mar. 18, 2005.

B2BUA Anyone using B2BUA for pbx applications? http://www.vovida.org/pipermail/b2bua/2003-February/000116.html Mar. 17, 2005.

* cited by examiner

NETWORK, PRIVATE BRANCH EXCHANGE, AND PBX ADDITIONAL SERVICE STARTING METHOD

BACKGROUND OF THE INVENTION

1. Field of the Invention

The present invention relates to a network, a private branch exchange, and a PBX additional service starting method, particularly to a terminal connected to a network including an Internet protocol private branch exchange (IP-PBX).

2. Related Background Art

This type of network has heretofore been constituted by connection of a private branch exchange to a fixed phone terminal, a radio terminal such as a personal handy-phone system (PHS), a voice over Internet protocol (VoIP) terminal or the like via a local area network (LAN).

As the VoIP terminal, in addition to an IP phone terminal and an Internet phone terminal, there is a session initiation protocol terminal. The SIP is a communication protocol for use in starting or ending multimedia communication such as sound communication (fixed phone, cellular phone, etc.), video communication such as television phone, chat (conversation by characters) and the like in an environment of an IP network using data having a form referred to as an IP packet.

In the IP network, in general, connection-less type communication is performed without confirming connection to a target as in electronic mails. On the other hand, in the fixed phone, in general, connection type communication is performed while confirming the connection with the target. The SIP realizes the connection type communication in the IP network.

The SIP basically comprises methods (operations) such as INVITE (session between users is established), ACK (acknowledgment), CANCEL (INVITE is ended during the establishment of the session), and BYE (the end of the session). The respective methods are exchanged as requests and responses to the requests between clients and servers to thereby establish or end the session.

Moreover, the SIP has characteristics that applications can be comparatively easily prepared. For example, when a new service is added to H.323 of ITU-T for use in the IP phone, an H.450.x protocol which defines the H.323 additional service is added, and all H.323 end points on the network and software of a gate keeper need to be updated. However, in the SIP, an SIP application server which provides the new service is added, and the corresponding application is added. Then, the new service is usable.

In a conventional SIP terminal, when a call is transferred during calling, two types of transfer services can be provided [simple operation (unattended transfer) (a transfer method in which a transferor resets before a response of a transfer target)/completely automatic transfer (attended transfer) (a transfer method in which the transferor resets after the transfer target makes the response)]. For example, when the simple operation is used as the transfer service in the conventional SIP terminal, as shown in FIGS. 12 to 14, the call is transferred to SIP corresponding terminal #3 during the calling between SIP corresponding terminals #1 and #2.

When a key operation of the simple operation is performed (f2 of FIG. 12) during the calling between the SIP corresponding terminals #1 and #2 (f1 of FIG. 12), the SIP corresponding terminal #2 sends "REFER" to the SIP corresponding terminal #1 (f3 of FIG. 12). In response to this, the SIP corresponding terminal #1 returns "202 Accepted" to the SIP corresponding terminal #2 (f4 of FIG. 12), and sends "NOTIFY" (f5 of FIG. 12), and therefore the SIP corresponding terminal #2 returns "200 OK" to the SIP corresponding terminal #1 (f6 of FIG. 12).

Thereafter, the SIP corresponding terminal #2 disconnects the calling with the SIP corresponding terminal #1 (f7 of FIG. 12), and sends "BYE" to the SIP corresponding terminal #1 (f8 of FIG. 12). The SIP corresponding terminal #1 sends "200 OK" to the SIP corresponding terminal #2 (f9 of FIG. 12), and thereafter sends "INVITE (w/SDP)" to the SIP corresponding terminal #3 (f10 of FIG. 12).

After sending "180 Ringing" to the SIP corresponding terminal #1 (f11 of FIG. 12), the SIP corresponding terminal #3 responds to the calling (f12 of FIG. 12), and sends "200 OK (w/SDP)" to the SIP corresponding terminal #1 (f13 of FIG. 12). In response to this, the SIP corresponding terminal #1 returns "ACK" to the SIP corresponding terminal #3 (f14 of FIG. 12), and then the SIP corresponding terminals #1 and #3 enters the calling (f15 of FIG. 12).

Thereafter, since the SIP corresponding terminal #1 sends "NOTIFY" to the SIP corresponding terminal #2 (f16 of FIG. 12), the SIP corresponding terminal #2 returns "200 OK" to the SIP corresponding terminal #1 (f17 of FIG. 12).

On the other hand, when a key operation of completely automatic transfer is performed (g2 of FIG. 13) during the calling between the SIP corresponding terminals #1 and #2 (g1 of FIG. 13), the SIP corresponding terminal #2 sends "INVITE (Hold)" to the SIP corresponding terminal #1 (g3 of FIG. 13). When the "200 OK" returns from the SIP corresponding terminal #1 (g4 of FIG. 13), the SIP corresponding terminal #2 returns "ACK" to the SIP corresponding terminal #1 (g5 of FIG. 13), and sends "INVITE (w/SDP)" to the SIP corresponding terminal #3 (g6 of FIG. 13).

The SIP corresponding terminal #3 returns "180 Ringing" to the SIP corresponding terminal #2 (g7 of FIG. 13), responds to the calling with the SIP corresponding terminal #2 (g8 of FIG. 13), and returns "200 OK (w/SDP)" to the SIP corresponding terminal #2 (g9 of FIG. 13). When the SIP corresponding terminal #2 returns "ACK" to the SIP corresponding terminal #3 (g10 of FIG. 13), the SIP corresponding terminals #2 and #3 enter the calling (g11 of FIG. 13).

Thereafter, when disconnected (g12 of FIG. 13), the SIP corresponding terminal #2 sends "INVITE (Hold)" to the SIP corresponding terminal #3 (g13 of FIG. 13). Then, the SIP corresponding terminal #3 returns "200 OK (w/SDP)" to the SIP corresponding terminal #2 (g14 of FIG. 13). Therefore, the SIP corresponding terminal #2 returns "ACK" to the SIP corresponding terminal #3 (g15 of FIG. 13), and sends "REFER" to the SIP corresponding terminal #1 (g16 of FIG. 13).

The SIP corresponding terminal #1 returns "202 Accepted" to the SIP corresponding terminal #2 (g17 of FIG. 13), and also sends "NOTIFY" (g18 of FIG. 13). In response to this, the SIP corresponding terminal #1 sends "INVITE (w/SDP)" to the SIP corresponding terminal #3 (g20 of FIG. 14).

Since the SIP corresponding terminal #3 returns "200 OK (w/SDP)" to the SIP corresponding terminal #1 (g21 of FIG. 14), the SIP corresponding terminal #1 sends "ACK" to the SIP corresponding terminal #3 (g22 of FIG. 14), and the SIP corresponding terminals #1 and #3 enter the calling (g23 of FIG. 14).

When the SIP corresponding terminal #3 sends "BYE" to the SIP corresponding terminal #2 (g24 of FIG. 14), the SIP corresponding terminal #2 returns "200 OK" to the SIP corresponding terminal #3 (g25 of FIG. 14), the SIP corresponding terminal #1 sends "NOTIFY" to the SIP corresponding terminal #2 (g26 of FIG. 14), and then the SIP corresponding terminal #2 returns "200 OK" to the SIP corresponding terminal #1 (g27 of FIG. 14).

When these processes end, the SIP corresponding terminal #2 sends "BYE" to the SIP corresponding terminal #1 (g28 of FIG. 14), and the SIP corresponding terminal #1 returns "200 OK" to the SIP corresponding terminal #2 (g29 of FIG. 14).

Here, "INVITE" indicates a method for use in establishing the session among participants, "180 RINGING" indicates the ringing, "200 OK" indicates that the response is successful, "ACK" indicates a method for use in permitting the establishment of the session, "REFER" indicates a method indicating reference, "Accepted" indicates a method for indicating acceptance, "NOTIFY" is a method for returning the present state information, and "BYE" indicates a method for ending the session.

Japanese Patent Application Laid-Open No. 11-331371, Japanese Patent Publication No. 2003-502945, Japanese Patent Publication No. 2003-517764, and "SIP: Session Initiation Protocol" [RFC (Request for Comments) 3261, June 2002, 8th to 34th pages] disclose the earlier techniques as described above.

However, in the communication between the SIP terminals, there is a problem that only services (e.g., transfer service, service for calling among three, call waiting service, etc.) defined by Internet engineering task force (IETF) can be provided.

That is, even when the SIP terminals are connected to the above-described network in the communication between the SIP terminals, there is a problem that various services (e.g., callback service, extension interruption service, third party control service, etc.) provided by the private branch exchange cannot be received.

Moreover, there is a problem that version of software of the SIP terminal (the above-described client) itself needs to be upgraded to thereby add the service in a case where the new service is added to the communication between the SIP terminals.

When the call is transferred in the conventional SIP terminal during the calling, as described above, two types of transfer services (simple operation/completely automatic transfer) can be provided, but these transfer services have different sequences, and therefore the SIP terminal itself needs to be conscious of either transfer service to be used.

SUMMARY OF THE INVENTION

Therefore, an object of the present invention is to solve the above-described problems, and to provide a network capable of receiving various services provided with a private branch exchange without upgrading version of software of an SIP terminal itself, the private branch exchange, and a method of starting a PBX additional service for use in the exchange.

According to the present invention, there is provided a network including: at least a session initiation protocol (SIP) terminal which performs communication by an SIP for realizing connection type communication to perform the communication while confirming connection to a target in an Internet protocol (IP) network; and a private branch exchange which performs a call connection process between the terminals, the network comprising:

an SIP system protocol control module incorporated as one of component groups of the private branch exchange and constituted into the module using a mechanism of a back to back user agent (B2BUA) which operates as an acting user agent of a process of the SIP; and an additional service providing module which is incorporated as one of the component groups of the private branch exchange and which provides additional services of the private branch exchange in response to a key operation of the SIP terminal.

According to the present invention, there is provided a private branch exchange which performs a call connection process between terminals and into which an SIP system protocol control module constituted into a module using a mechanism of a back to back user agent (B2BUA) operating as an acting user agent of a process of a session initiation protocol (SIP) for realizing connection type communication to perform the communication while confirming connection to a target in an Internet protocol (IP) network, and an additional service providing module for providing an additional service in response to a key operation of the SIP terminal are incorporated as one of component groups.

According to the present invention, there is provided a PBX additional service starting method of a network including: at least a session initiation protocol (SIP) terminal which performs communication by an SIP for realizing connection type communication to perform the communication while confirming connection to a target in an Internet protocol (IP) network; and a private branch exchange which performs a call connection process between the terminals, the method comprising the steps of:

incorporating an SIP system protocol control module constituted into the module using a mechanism of a back to back user agent (B2BUA) which operates as an acting user agent, and an additional service providing module as one of the component groups of the private branch exchange; and allowing the SIP system protocol control module to perform a process of the SIP, and allowing the additional service providing module to provide an additional service of the private branch exchange in response to a key operation of the SIP terminal.

That is, in an Internet protocol-private branch exchange (IP-PBX) of the present invention, the session initiation protocol (SIP) process is constituted into the module using the mechanism of the back to back user agent (B2BUA), and incorporated into one of the component groups of the private branch exchange. The private branch exchange provides mutual connection, or additional service to each protocol group constituted into the module.

Moreover, in the network of the present invention, message elements (hooking, tone indication, etc.) for starting the additional services (e.g., call back service, extension interruption service, third party control service, etc.) of the private branch exchange which have heretofore been used are defined in INFO message which is a method of the SIP, and accordingly it is possible to provide various additional services of the existing private branch exchange to the SIP terminal in a transmission manner.

Furthermore, in the network of the present invention, even when the new additional service is added to the private branch exchange, it is possible to start the additional service of the private branch exchange from the key operation (hooking) of the SIP terminal, and therefore the software of the SIP terminal itself does not have to be changed.

In the network of the present invention, a user may simply perform a hooking operation, and input a transfer target extension number regardless of the transfer method (e.g., simple operation/completely automatic transfer, etc.). When the simple operation is to be performed, disconnection may be performed before a target makes a response. To perform the completely automatic transfer, the disconnection may be performed after the target makes the response. Thus, in the network of the present invention, when the user simply performs the hooking operation, and inputs the number for starting the service, it is possible to utilize the additional service of the private branch exchange.

In the network of the present invention, the process of the SIP is constituted into the module using the mechanism of B2BUA, and incorporated as one of the component groups of the private branch exchange, and accordingly the SIP terminal can be treated as one extension of the private branch exchange. Therefore, when the key operation (hooking) is performed to thereby send the INFO message including the presently defined message elements to the private branch exchange from the SIP terminal, the corresponding additional service can be started by the private branch exchange that has received the INFO message, and an appropriate additional service can be controlled with respect to the SIP terminal.

The private branch exchange allows the user who operates the extension terminal to listen to various tones to thereby inform that the service has been started or a transmission target is busy on the line. In the network of the present invention, information elements for controlling the tone are included in the INFO message, and by linking with the SIP terminal capable of recognizing the INFO message, the control of the tone from the private branch exchange, which has heretofore been impossible in the conventional SIP terminal, is possible.

For example, the SIP terminal sets absence transfer which is the service of the private branch exchange. In this case, to inform that the service has been normally set, the use is allowed to hear a service set tone. The tone cannot be heard in the conventional SIP terminal, and there has not been a technique to know that the service has been normally set. However, in the SIP terminal corresponding to the network of the present invention, it is possible to hear the tone, and to know that the service has been normally set.

Thus, in the network of the present invention, when the tone is controlled with respect to the SIP terminal, and the tone from the SIP terminal is heard, accordingly the user who operates the SIP terminal can recognize a service state, the SIP terminal itself is not conscious of the service, and it is possible to utilize various services of the private branch exchange.

Therefore, in a system in which a standard SIP terminal is combined with a standard SIP proxy server, connection to various existing protocols requiring a large number of steps for realization is flexibly realized, and it is also possible to utilize various additional services of the existing private branch exchange.

Moreover, protocols constituted by expanding the SIP, such as expanded SIP protocols a and b, are constituted into modules using the mechanism of B2BUA, and incorporated into the private branch exchange in the same manner as described above. Accordingly, the additional services which are difficult to realize in a range of standard SIP protocol can be flexibly realized. Moreover, it is also possible to connect even the terminals to not only the standard SIP protocol terminal but also the existing protocol terminal.

In the present invention, by the following constitution and operation, an effect can be obtained that various services provided by the private branch exchange can be received without upgrading the version of the software of the SIP terminal itself.

DESCRIPTION OF THE PREFERRED EMBODIMENTS

Figure 1:
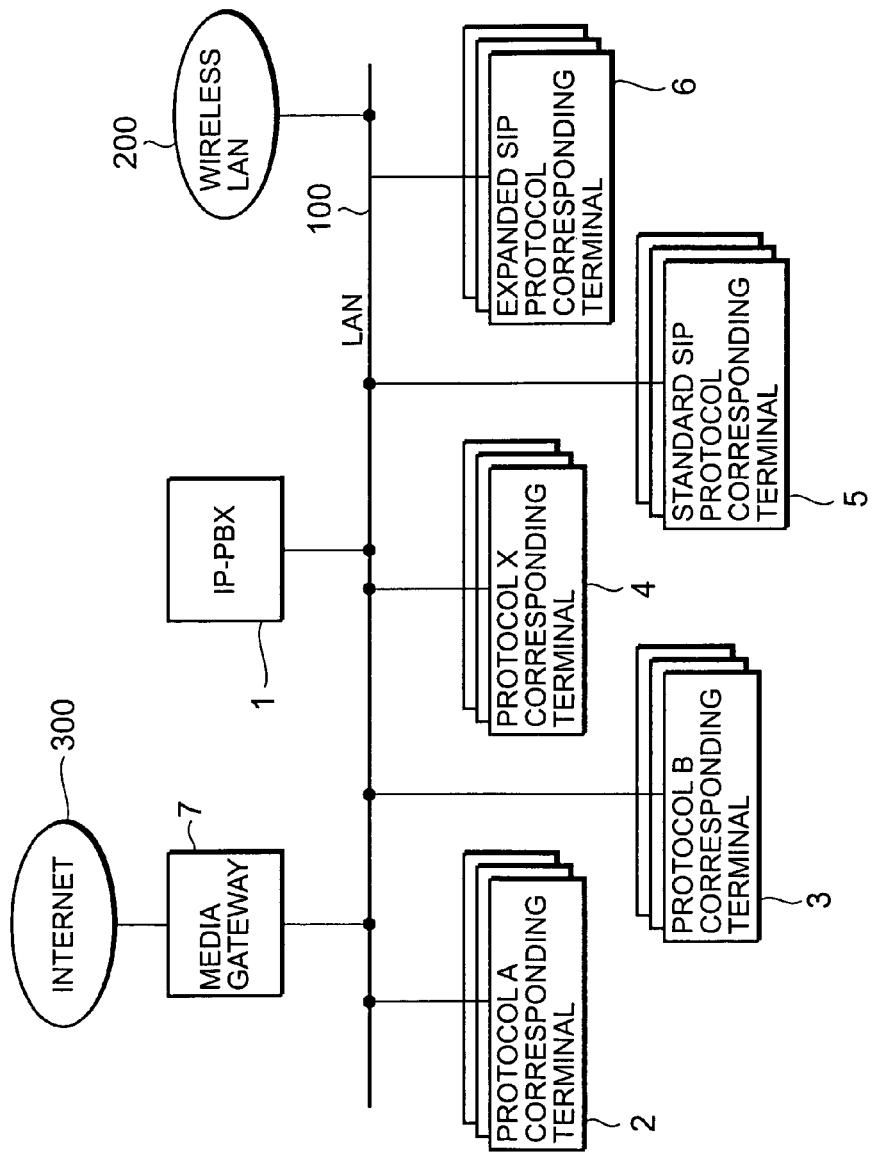
FIG. 1 is a block diagram showing a constitution of a network according to one embodiment of the present invention.

Next, embodiments of the present invention will be described with reference to the drawings. FIG. 1 is a block diagram showing a constitution of a network according to one embodiment of the present invention. In FIG. 1, in the constitution of the network according to one embodiment of the present invention, an Internet protocol-private branch exchange (IP-PBX: IP corresponding private branch exchange) 1, a protocol A corresponding terminal 2, a protocol B corresponding terminal 3, a protocol X corresponding terminal 4, a standard session initiation protocol (SIP) protocol corresponding terminal 5, an expanded SIP protocol corresponding terminal 6, a media gate way 7, and a wireless LAN 200 are connected to one another via a local area network (LAN) 100. The constitution is connected to Internet 300 via the media gate way 7.

Figure 2:
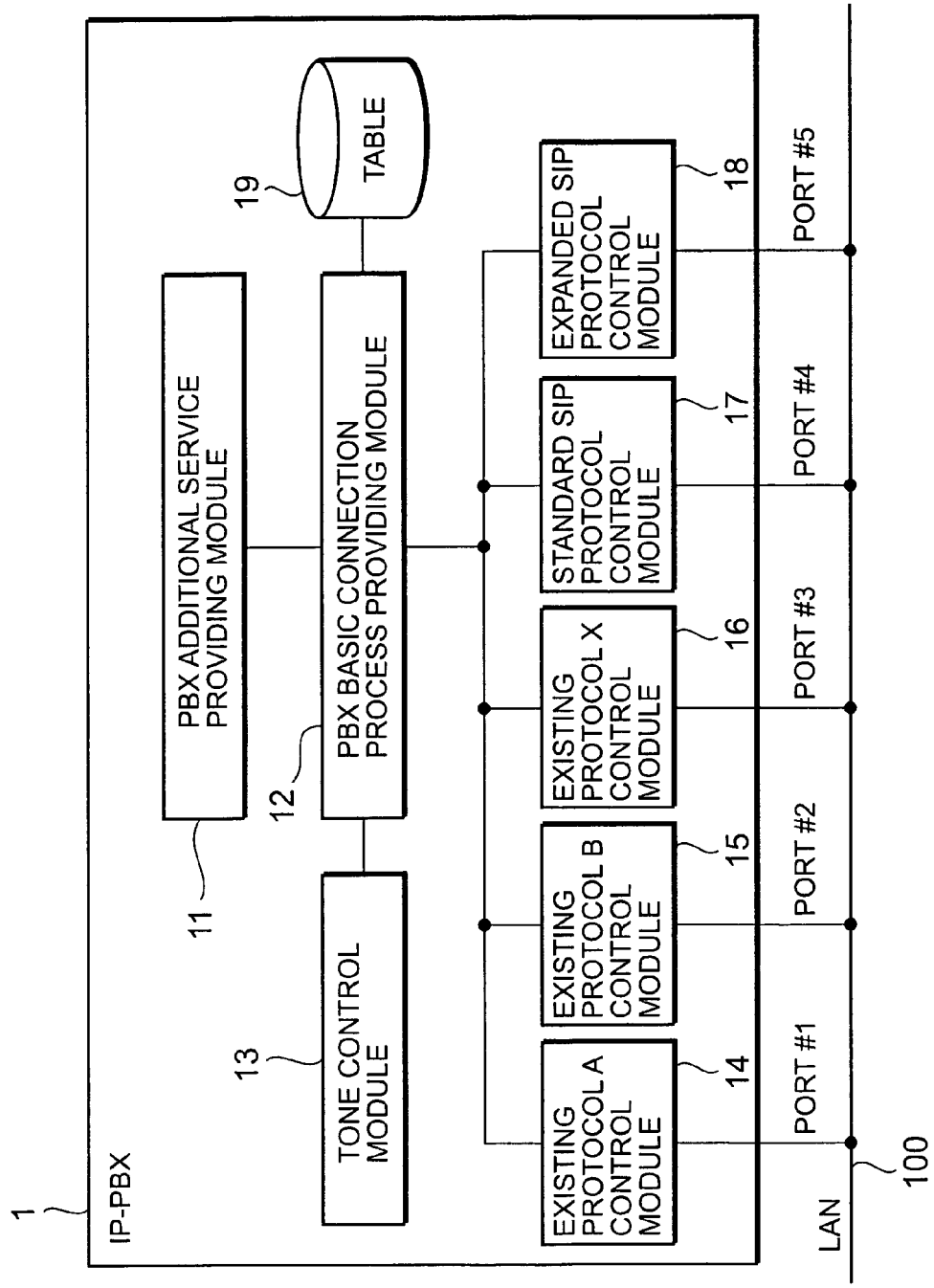
FIG. 2 is a block diagram showing a constitution of an IP-PBX of FIG. 1.

FIG. 2 is a block diagram showing a constitution of the IP-PBX 1 of FIG. 1. In FIG. 2, the IP-PBX 1 comprises: a PBX additional service providing module 11; a PBX basic connection process providing module 12; a tone control module 13; an existing protocol A control module 14; an existing protocol B control module 15; an existing protocol X control module 16; a standard SIP protocol control module 17; an expanded SIP protocol control module 18; and a table 19.

The standard SIP protocol control module 17 and the expanded SIP protocol control module 18 terminate an SIP system protocol, the process of the SIP is constituted into a module using a mechanism of a back to back user agent (B2BUA), and incorporated as one of component groups of the IP-PBX 1, and the module can be realized even by hardware or software. The IP-PBX 1 provides mutual connection, and additional services with respect to each protocol group constituted into the above-described module.

Here, the B2BUA is a logical entity (function) which processes a request (message) as a user agent server, when receiving SIP request (SIP message) from an SIP terminal of a transmitter. To determine an answer to the request from the SIP terminal of the transmitter, the B2BUA operates as a user agent client with respect to the SIP terminal of the transmitter, and produces the request to the SIP terminal of a transmission target.

That is, in the B2BUA, a private user agent is combined with a public user agent, and the B2BUA operates as a user agent with respect to each network (terminal).

The PBX additional service providing module 11 provides additional services (e.g., call back service, extension interruption service, third party control service, etc.) to the protocol A corresponding terminal 2, the protocol B corresponding terminal 3, the protocol X corresponding terminal 4, the standard SIP protocol corresponding terminal 5, and the expanded SIP protocol corresponding terminal 6.

The PBX basic connection process providing module 12 provides a basic connection process, and mutual connection with respect to the protocol A corresponding terminal 2, the protocol B corresponding terminal 3, the protocol X corresponding terminal 4, the standard SIP protocol corresponding terminal 5, and the expanded SIP protocol corresponding terminal 6. The tone control module 13 performs a tone control process with respect to the protocol A corresponding terminal 2, the protocol B corresponding terminal 3, the protocol X corresponding terminal 4, the standard SIP protocol corresponding terminal 5, and the expanded SIP protocol corresponding terminal 6.

The existing protocol A control module 14 is disposed for the protocol A corresponding terminal 2, and converts a signal from the protocol A corresponding terminal 2 into a signal of a protocol (hereinafter referred to as the PBX internal protocol) inside the IP-PBX 1, and transmits the signal to the PBX basic connection process providing module 12. Moreover, the control module converts a signal from the PBX basic connection process providing module 12 into a signal of a protocol A, and transmits the signal to the protocol A corresponding terminal 2.

The existing protocol B control module 15 is disposed for the protocol B corresponding terminal 3, and converts a signal from the protocol B corresponding terminal 3 into a signal of the PBX internal protocol, and transmits the signal to the PBX basic connection process providing module 12. Moreover, the control module converts a signal from the PBX basic connection process providing module 12 into a signal of a protocol B, and transmits the signal to the protocol B corresponding terminal 3.

The existing protocol X control module 16 is disposed for the protocol X corresponding terminal 4, and converts a signal from the protocol X corresponding terminal 4 into a signal of the PBX internal protocol, and transmits the signal to the PBX basic connection process providing module 12. Moreover, the control module converts a signal from the PBX basic connection process providing module 12 into a signal of a protocol X, and transmits the signal to the protocol X corresponding terminal 4.

The standard SIP protocol control module 17 is disposed for the standard SIP protocol corresponding terminal 5, and converts a signal from the standard SIP protocol corresponding terminal 5 into a signal of the PBX internal protocol, and transmits the signal to the PBX basic connection process providing module 12. Moreover, the control module converts a signal (response to the request, or request to the standard SIP protocol corresponding terminal 5) from the PBX basic connection process providing module 12 into a signal of a standard SIP protocol, and transmits the signal to the standard SIP protocol corresponding terminal 5.

The expanded SIP protocol control module 18 is disposed for the expanded SIP protocol corresponding terminal 6, and converts a signal (request) from the expanded SIP protocol corresponding terminal 6 into a signal of the PBX internal protocol, and transmits the signal to the PBX basic connection process providing module 12. Moreover, the control module converts a signal (a response to the request, or a request to the expanded SIP protocol corresponding terminal 6) from the PBX basic connection process providing module 12 into a signal of an expanded SIP protocol a, and transmits the signal to the expanded SIP protocol corresponding terminal 6.

Here, port number (ports #1 to #5) or IP address (local or global IP address) is assigned to each of the existing protocol A control module 14, existing protocol B control module 15, existing protocol X control module 16, standard SIP protocol control module 17, and expanded SIP protocol control module 18. In the table 19, the protocol of the corresponding terminal is held for each assigned port number or IP address. The PBX basic connection process providing module 12 refers to the table 19 to judge the protocol from the port number or the IP address.

Figure 3:
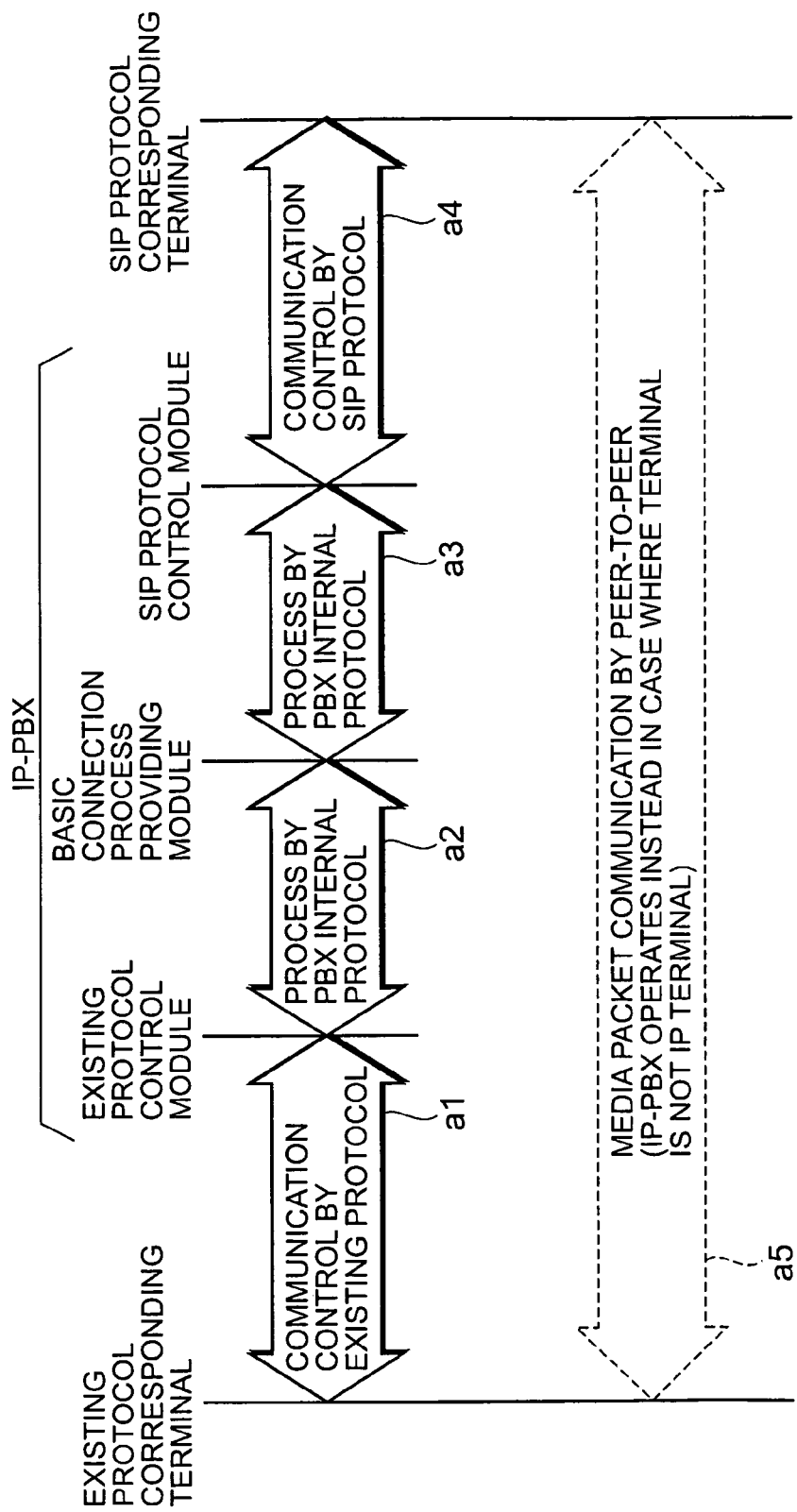
FIG. 3 is a sequence chart showing a process operation of the IP-PBX of FIG. 1.
Figure 4:
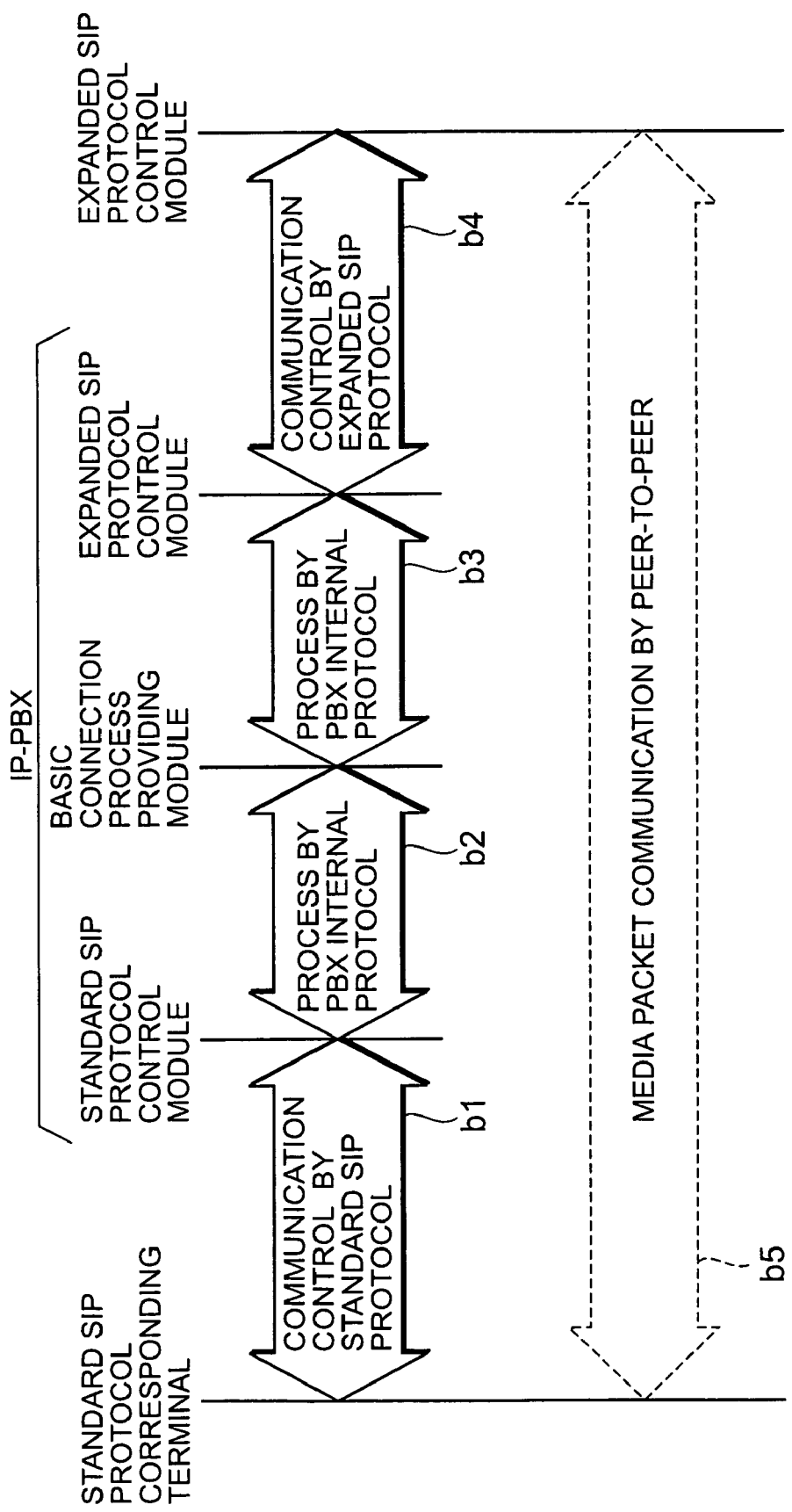
FIG. 4 is a sequence chart showing a process operation of the IP-PBX of FIG. 1.

FIGS. 3 and 4 are sequence charts showing a process operation of the IP-PBX 1 of FIG. 1. The process operation of the IP-PBX 1 will be described with reference to FIGS. 1 to 4. These processes are realized by either hardware or software (program).

First, a process will be described in a case where the existing protocol corresponding terminal (the protocol A corresponding terminal 2, the protocol B corresponding terminal 3, the protocol X corresponding terminal 4 of FIG. 1) requests connection to the SIP system protocol corresponding terminal (the standard SIP protocol corresponding terminal 5, and the expanded SIP protocol corresponding terminal 6 of FIG. 1).

When the existing protocol corresponding terminal transmits a request for connection to the SIP system protocol corresponding terminal with respect to the IP-PBX 1, the existing protocol control module (the existing protocol A control module 14, existing protocol B control module 15, existing protocol X control module 16 of FIG. 2) of the IP-PBX 1 accepts the connection request from the existing protocol corresponding terminal in the communication control of the existing protocol (a1 if FIG. 3), converts the connection request of the existing protocol into the signal of the PBX internal protocol, and sends the signal to the PBX basic connection process providing module 12 (process by the PBX inner protocol) (a2 of FIG. 3).

The PBX basic connection process providing module 12 processes the connection request from the existing protocol corresponding terminal to transfer the request to the SIP system protocol control module (standard SIP protocol control module 17, expanded SIP protocol control module 18 of FIG. 2) (processing by the PBX internal protocol) (g3 of FIG. 3).

The SIP system protocol control module converts a signal from the PBX basic connection process providing module 12 into the connection request of the SIP system protocol, and transmits the connection request to the SIP protocol corresponding terminal in the communication control of the SIP system protocol (g4 of FIG. 3).

When the session between the existing protocol corresponding terminal and the SIP system protocol corresponding terminal is established by the above-described process, the media packet between the existing protocol corresponding terminal and the SIP system protocol corresponding terminal is communicated by peer-to-peer (a5 of FIG. 3). Additionally, when one of the terminals is not the IP terminal, the communication of the media packet is performed by the IP-PBX 1 instead.

It is to be noted that when the additional service of the IP-PBX 1 is utilized in the communication between the existing protocol corresponding terminal and the SIP protocol corresponding terminal, the request is transferred to the PBX additional service providing module 11 from the PBX basic connection process providing module 12 and processed.

Next, a process will be described in a case where the standard SIP protocol corresponding terminal 5 requests the connection with respect to the expanded SIP protocol corresponding terminal 6.

When the standard SIP protocol corresponding terminal 5 transmits the connection request to the expanded SIP protocol corresponding terminal 6, the standard SIP protocol control module 17 of the IP-PBX 1 accepts the connection request from the IP-PBX 1 accepts the connection request from the standard SIP protocol corresponding terminal 5 in the communication control of the standard SIP protocol (b1 of FIG. 4). The module converts the connection request of the standard SIP protocol into the signal of the PBX internal protocol, and sends the signal to the PBX basic connection process providing module 12 (processing by the PBX internal protocol) (b2 of FIG. 4).

The PBX basic connection process providing module 12 processes the connection request from the standard SIP protocol corresponding terminal 5, and transfers the request to the expanded SIP protocol control module 18 (processing by the PBX internal protocol) (b3 of FIG. 4).

The expanded SIP protocol control module 18 converts the signal from the PBX basic connection process providing module 12 into the connection request of the expanded SIP protocol, and transmits the connection request to the expanded SIP protocol corresponding terminal 6 in the expanded SIP protocol (b4 of FIG. 4).

When the session between the standard SIP protocol corresponding terminal 5 and the expanded SIP protocol corresponding terminal 6 is established by the above-described process, the media packet between the standard SIP protocol corresponding terminal 5 and the expanded SIP protocol corresponding terminal 6 is communicated by the peer-to-peer (b5 of FIG. 4).

In the present embodiment, in the above-described constitution, the message elements (hooking, tone indication, etc.) for starting the additional service of the existing IP-PBX which has heretofore been used are defined in the INFO message which is the method of the SIP. Accordingly, in the present embodiment, various additional services of the existing IP-PBX can be provided to the SIP terminal.

Moreover, in the present embodiment, even when a new additional service is added to the existing IP-PBX, the additional service of the IP-PBX can be started from the key operation (hooking) of the SIP terminal, and therefore the software of the SIP terminal itself does not have to be changed.

That is, in the present embodiment, as in the above-described standard SIP protocol control module 17 and expanded SIP protocol control module 18, the process of the SIP is constituted into the module using the mechanism of B2BUA, and incorporated as one of component groups of the IP-PBX 1. Accordingly, the standard SIP protocol corresponding terminal 5 or the expanded SIP protocol corresponding terminal 6 can be processed as one extension of the IP-PBX 1.

Therefore, in the present embodiment, when the INFO message including the message element defined as described above is sent to the IP-PBX 1 by the key operation (hooking) from the standard SIP protocol corresponding terminal 5 or the expanded SIP protocol corresponding terminal 6, the corresponding additional service is started by the IP-PBX 1 that has received the INFO message, and an appropriate additional service is controlled with respect to the standard SIP protocol corresponding terminal 5 or the expanded SIP protocol corresponding terminal 6.

When a call is transferred during the calling in the conventional SIP terminal, service sequences are different as described above in two types of transfer services [simple operation (unattended transfer) (a transfer method in which a transferor resets before a target of a transfer target makes a response)/completely automatic transfer (attended transfer) (a transfer method in which the transferor resets after the target of the transfer target makes the response). Therefore, the SIP terminal itself needs to be conscious of either transfer service to use.

On the other hand, in the present embodiment, a user of the SIP terminal may simply perform a hooking operation and input a transfer target extension number regardless of the above-described transfer method. When the simple operation is to be performed, disconnection may be performed before the target makes the response. When the completely automatic transfer is to be performed, the disconnection may be performed after the target makes the response.

Thus, when the user of the SIP terminal simply inputs the hooking operation and the number for starting the service in the present embodiment, the additional service of the IP-PBX 1 can be utilized.

Figure 5:
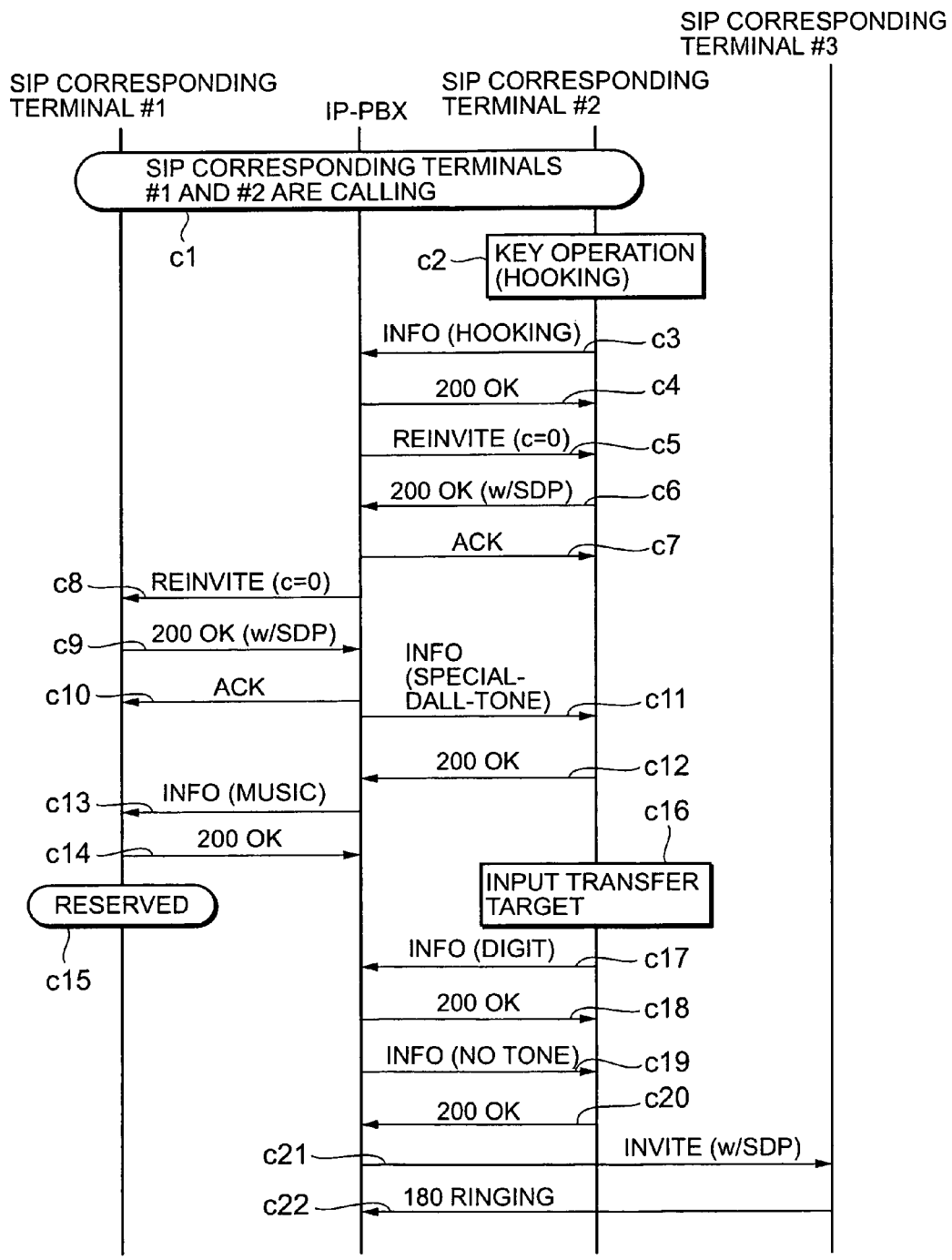
FIG. 5 is a sequence chart showing a process in a case where a simple operation is used as a transfer service via the IP-PBX of FIG. 1.
Figure 6:
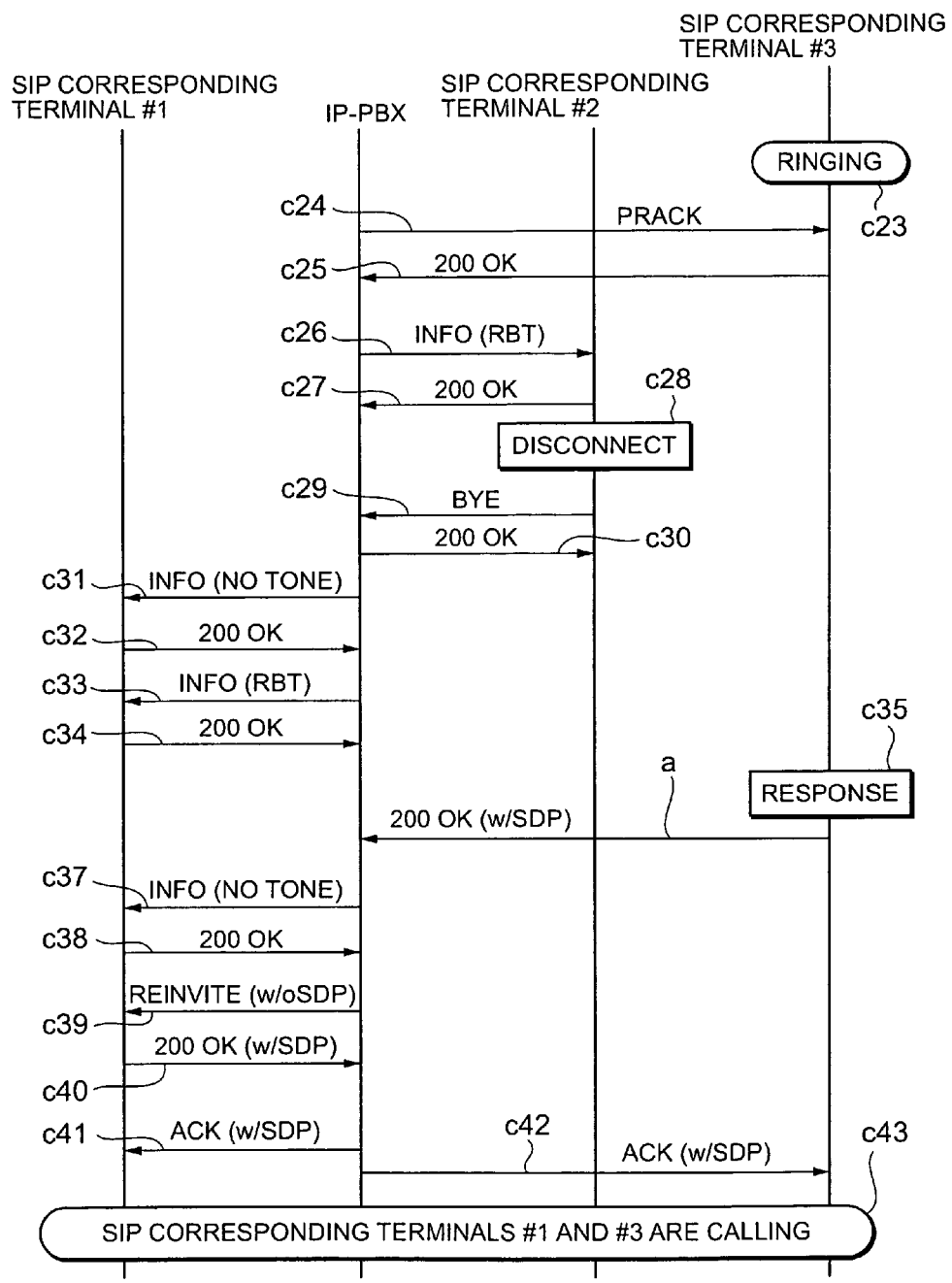
FIG. 6 is a sequence chart showing a process in a case where the simple operation is used as the transfer service via the IP-PBX of FIG. 1.

FIGS. 5 and 6 are sequence charts showing a process in a case where the simple operation is used as the transfer service via the IP-PBX 1 of FIG. 1. A process will be described in a case where the simple operation is used as the transfer service via the IP-PBX 1 with reference to FIGS. 1, 2, 5, and 6. In the following description, it is assumed that transfer to an SIP corresponding terminal #3 is performed during the calling between SIP corresponding terminals #1 and #2.

When the key operation (hooking) is performed (c2 of FIG. 5) during the calling between the SIP corresponding terminals #2 and #1 (c1 of FIG. 5), "INFO (Hooking)" is sent to the IP-PBX 1 (c3 of FIG. 5). The IP-PBX 1 sends "200 OK" to the SIP corresponding terminal #2 (c4 of FIG. 5), and also sends "reINVITE (c=0)" to the SIP corresponding terminal #2 (c5 of FIG. 5).

When the SIP corresponding terminal #2 returns "200 OK (w/SDP)" (c6 of FIG. 5), the IP-PBX 1 sends "ACK" to the SIP corresponding terminal #2 (c7 of FIG. 5), and also sends "reINVITE (c=0)" to the SIP corresponding terminal #1 (c8 of FIG. 5).

When the SIP corresponding terminal #1 returns "200 OK (w/SDP)" (c9 of FIG. 5), the IP-PBX 1 sends "ACK" to the SIP corresponding terminal #1 (C10 of FIG. 5), and also sends "INFO (Special-Dial-Tone)" to the SIP corresponding terminal #2 (c11 of FIG. 5) to notify that the following process be performed.

When the SIP corresponding terminal #2 returns "200 OK" (c12 of FIG. 5), the IP-PBX 1 sends "INFO (MUSIC)" to the SIP corresponding terminal #1 (c13 of FIG. 5) to notify that the process is being performed. The SIP corresponding terminal #1 sends "200 OK" to the IP-PBX 1 (c14 of FIG. 5), and is being reserved (c15 of FIG. 5).

On the other hand, when a transfer target is input (c16 of FIG. 5), the SIP corresponding terminal #2 notified to perform the next process by the IP-PBX 1 informs the contents to the IP-PBX 1 by "INFO (DIGIT)" (c17 of FIG. 5). The IP-PBX 1 sends "200 OK" to the notice (c18 of FIG. 5), and sends "INFO (No Tone)" to the SIP corresponding terminal #2 (c19 of FIG. 5).

When the SIP corresponding terminal #2 returns "200 OK" (c20 of FIG. 5), the IP-PBX 1 sends "INVITE (w/SDP)" to the SIP corresponding terminal #3 (c21 of FIG. 5), the SIP corresponding terminal #3 sends "180 Ringing" to the IP-PBX 1 (c22 of FIG. 5), and the ringing is performed (c23 of FIG. 6).

When the IP-PBX 1 sends "PRACK" to the SIP corresponding terminal #3 (c24 of FIG. 6), and "200 OK" returns from the SIP corresponding terminal #3 (c25 of FIG. 6), the IP-PBX sends "INFO (RBT)" to the SIP corresponding terminal #2 (c26 of FIG. 6). The SIP corresponding terminal #2 sends "200 OK" to the IP-PBX 1 (c27 of FIG. 6), disconnects the calling with the SIP corresponding terminal #1 (c28 of FIG. 6), and sends "BYE" to the IP-PBX 1 (c29 of FIG. 6).

The IP-PBX 1 sends "200 OK" to the SIP corresponding terminal #2 (c30 of FIG. 6), and also sends "INFO (No Tone)" to the SIP corresponding terminal #1 (c31 of FIG. 6). Thereafter, when "200 OK" returns from the SIP corresponding terminal #1 (c32 of FIG. 6), the IP-PBX 1 sends "INFO (RBT)" to the SIP corresponding terminal #1 (c33 of FIG. 6). The SIP corresponding terminal #1 returns "200 OK" to the IP-PBX 1 (c34 of FIG. 6).

When the SIP corresponding terminal #3 responds (c35 of FIG. 6), and sends "200 OK (w/SDP)" (c36 of FIG. 6), the IP-PBX 1 sends "INFO (No Tone)" to the SIP corresponding terminal #1 (c37 of FIG. 6). When "200 OK" returns from the SIP corresponding terminal #1 (c38 of FIG. 6), the IP-PBX 1 sends "reINVITE (w/o SDP)" to the SIP corresponding terminal #1 (c39 of FIG. 6).

When "200 OK (w/SDP)" returns from the SIP corresponding terminal #1 (c40 of FIG. 6), the IP-PBX 1 sends "ACK (w/SDP)" to the SIP corresponding terminal #3 (c42 of FIG. 6). Accordingly, the SIP corresponding terminals #1 and #3 are calling (c43 of FIG. 6).

Figure 7:
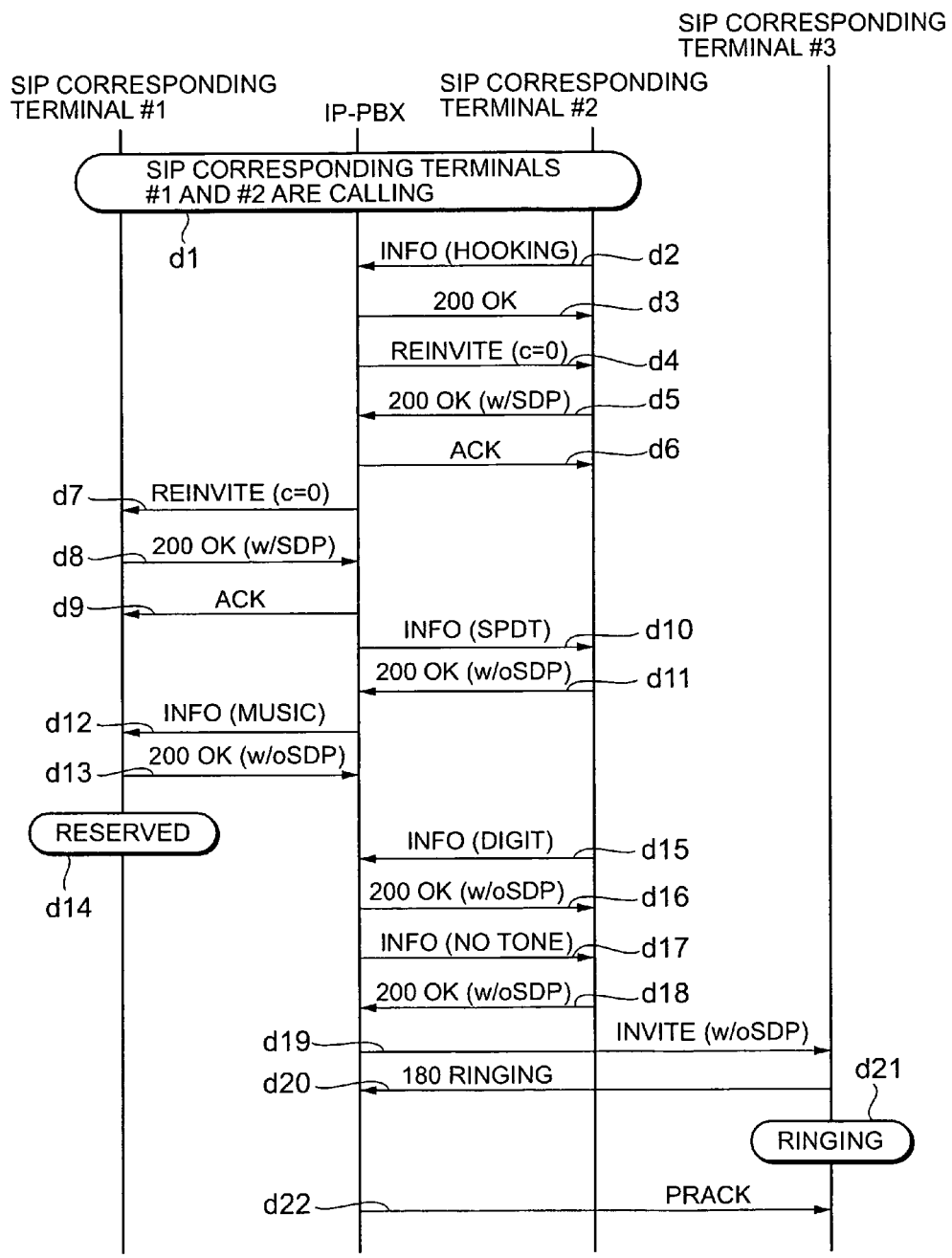
FIG. 7 is a sequence chart showing a process in a case where completely automatic transfer is used as the transfer service via the IP-PBX of FIG. 1.
Figure 8:
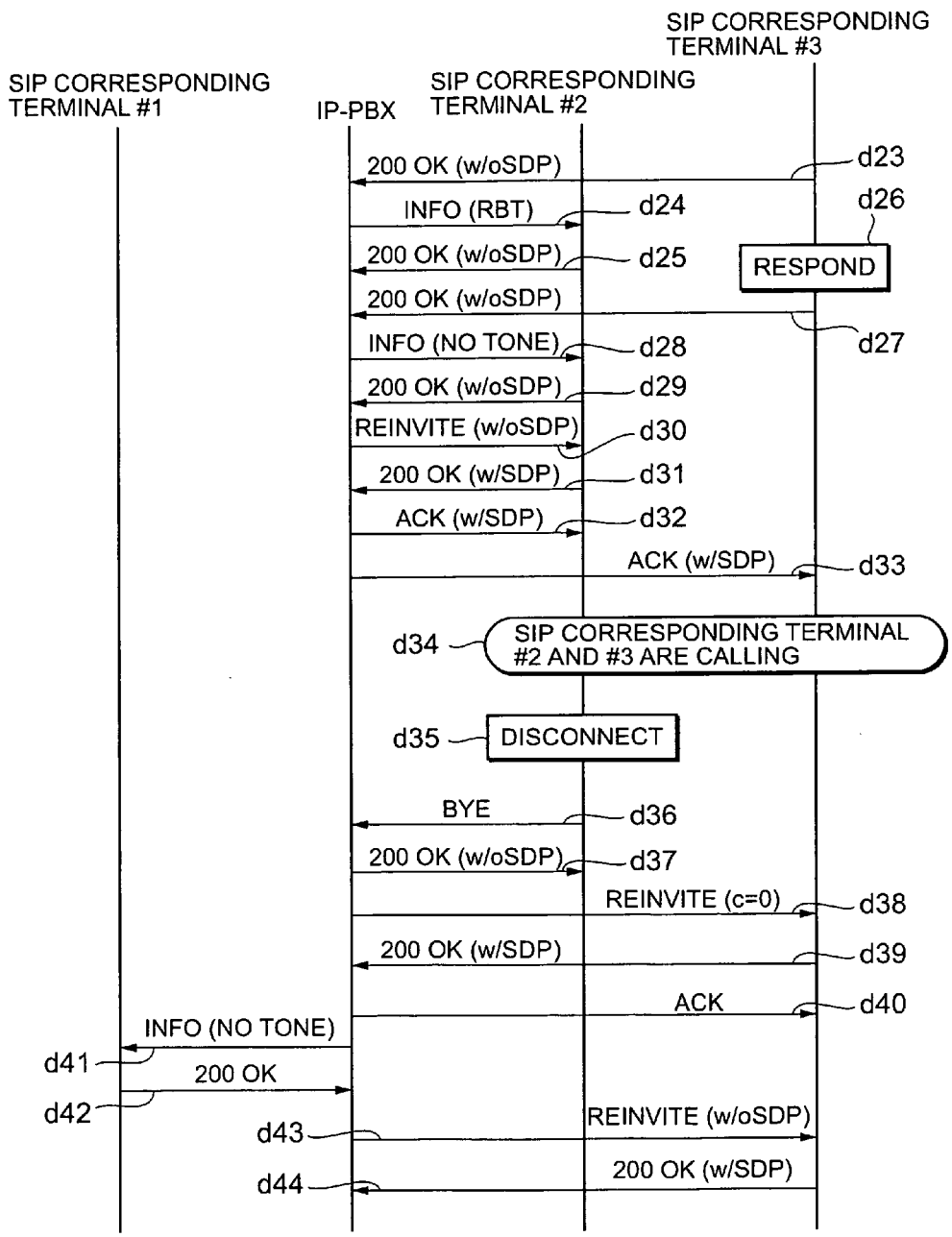
FIG. 8 is a sequence chart showing a process in a case where the completely automatic transfer is used as the transfer service via the IP-PBX of FIG. 1.
Figure 9:
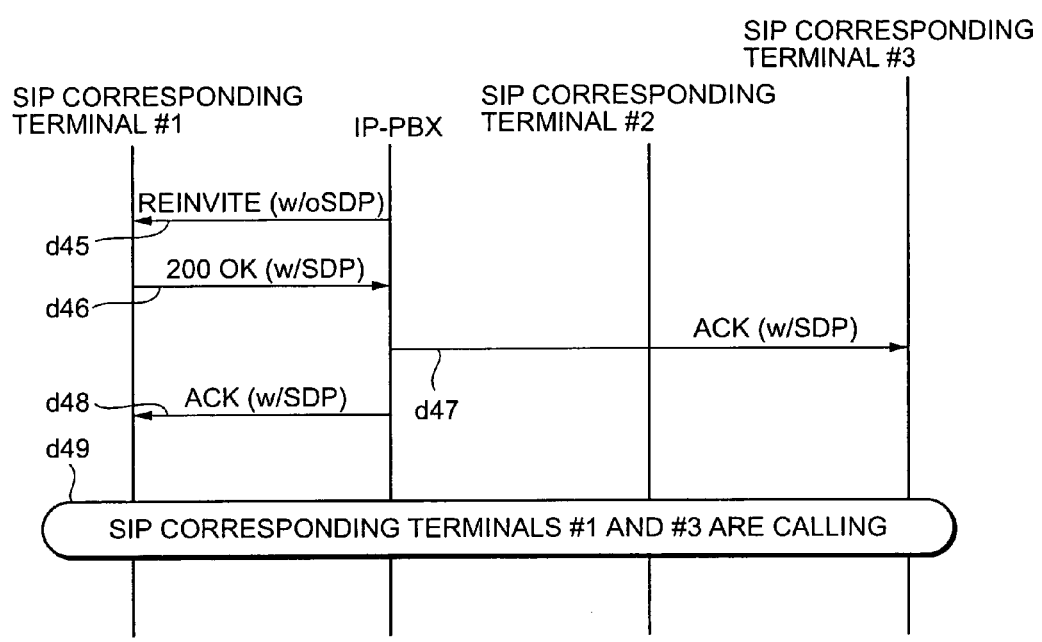
FIG. 9 is a sequence chart showing a process in a case where the completely automatic transfer is used as the transfer service via the IP-PBX of FIG. 1.

FIGS. 7 to 9 are sequence charts showing a process in a case where the completely automatic transfer is used as the transfer service via the IP-PBX 1 of FIG. 1. A process will be described in a case where the completely automatic transfer is used as the transfer service via the IP-PBX 1 with reference to FIGS. 1, 2, and 7 to 9. In the following description, it is assumed that the transfer to the SIP corresponding terminal #3 is performed during the calling between SIP corresponding terminals #1 and #2.

When the SIP corresponding terminal #2 sends "INFO (Hooking)" to the IP-PBX 1 (d2 of FIG. 7) during the calling with the SIP corresponding terminal #1 (d1 of FIG. 7), the IP-PBX 1 sends "200 OK" to the SIP corresponding terminal #2 (d3 of FIG. 7), and also sends "reINVITE (c=0)" to the SIP corresponding terminal #2 (d4 of FIG. 7).

When "200 OK (w/SDP)" returns from the SIP corresponding terminal #2 (d5 of FIG. 7), the IP-PBX 1 sends "ACK" to the SIP corresponding terminal #2 (d6 of FIG. 7), and sends "reINVITE (c=0)" to the SIP corresponding terminal #1 (d7 of FIG. 7).

When "200 OK (w/SDP)" returns from the SIP corresponding terminal #1 (d8 of FIG. 7), the IP-PBX 1 sends "ACK" to the SIP corresponding terminal #1 (d9 of FIG. 7), and sends "INFO (SPDT)" to the SIP corresponding terminal #2 (d10 of FIG. 7).

When "200 OK (w/o SDP)" returns from the SIP corresponding terminal #2 (d11 of FIG. 7), the IP-PBX 1 sends "INFO (MUSIC)" to the SIP corresponding terminal #1 (d12 of FIG. 7) to notify that the process is being performed. The SIP corresponding terminal #1 sends "200 OK" to the IP-PBX 1 (d13 of FIG. 7), and is being reserved (d14 of FIG. 7).

When "INFO (DIGIT)" is sent from the SIP corresponding terminal #2 (d15 of FIG. 7), the IP-PBX 1 sends "200 OK (w/o SDP)" to the SIP corresponding terminal #2 (d16 of FIG. 7), and sends "INFO (No Tone)" to the SIP corresponding terminal #2 (d17 of FIG. 7).

When "200 OK (w/o SDP)" is sent from the SIP corresponding terminal #2 (d18 of FIG. 7), the IP-PBX 1 sends "INVITE (w/o SOP)" to the SIP corresponding terminal #3 (d19 of FIG. 7). The SIP corresponding terminal #3 sends "180 Ringing" to the IP-PBX 1 (d20 of FIG. 7), and the ringing is performed (d21 of FIG. 7).

When the IP-PBX 1 sends "PRACK" to the SIP corresponding terminal #3 (d22 of FIG. 7), and "200 OK (w/o SDP)" returns from the SIP corresponding terminal #3 (d23 of FIG. 8), the IP-PBX sends "INFO (RBT)" to the SIP corresponding terminal #2 (d24 of FIG. 8). The SIP corresponding terminal #2 sends "200 OK (w/o SDP)" to the IP-PBX 1 (d25 of FIG. 8).

When the SIP corresponding terminal #3 responds (d26 of FIG. 8), and sends "200 OK (w/o SDP)" (d27 of FIG. 8), the IP-PBX 1 sends "INFO (No Tone)" to the SIP corresponding terminal #2 (d28 of FIG. 8). When "200 OK (w/o SOP)" returns from the SIP corresponding terminal #2 (d29 of FIG. 8), the IP-PBX 1 sends "reINVITE (w/o SDP)" to the SIP corresponding terminal #2 (d30 of FIG. 8).

When "200 OK (w/SDP)" returns from the SIP corresponding terminal #2 (d31 of FIG. 8), the SIP corresponding terminal #3 sends "ACK (w/SDP)" to the SIP corresponding terminal #2 (d32 of FIG. 8), and sends "ACK (w/SDP)" to the SIP corresponding terminal #3 (d33 of FIG. 8). Accordingly, the SIP corresponding terminals #2 and #3 are calling (d34 of FIG. 8).

Thereafter, the SIP corresponding terminal #2 disconnects the calling with the SIP corresponding terminal #1 (d35 of FIG. 8), and sends "BYE" to the IP-PBX 1 (d36 of FIG. 8). The IP-PBX 1 sends "200 OK (w/o SDP)" to the SIP corresponding terminal #2 (d37 of FIG. 8), and sends "reINVITE (c=0)" to the SIP corresponding terminal #3 (d38 of FIG. 8).

When "200 OK (w/SDP)" returns from the SIP corresponding terminal #3 (d39 of FIG. 8), the IP-PBX 1 sends "ACK" to the SIP corresponding terminal #3 (d40 of FIG. 8), and sends "INFO (No Tone)" to the SIP corresponding terminal #1 (d41 of FIG. 8).

When "200 OK" returns from the SIP corresponding terminal #1 (d42 of FIG. 8), the IP-PBX 1 sends "reINVITE (w/o SDP)" to the SIP corresponding terminal #3 (d43 of FIG. 8). When "200 OK (w/SDP)" returns from the SIP corresponding terminal #3 (d44 of FIG. 8), the IP-PBX 1 sends "reINVITE (w/o SDP)" to the SIP corresponding terminal #1 (d45 of FIG. 9).

When "200 OK (w/SDP)" returns from the SIP corresponding terminal #1 (d46 of FIG. 9), the IP-PBX 1 sends "ACK (w/SDP)" to the SIP corresponding terminal #1 (d47 of FIG. 9), and sends "ACK (w/SDP)" to the SIP corresponding terminal #3 (d48 of FIG. 9). Accordingly, the SIP corresponding terminals #1 and #3 are calling (d49 of FIG. 9).

As described above, the IP-PBX 1 allows the user who operates an extension terminal to hear various tones, and accordingly notifies that the service has been started and a transmission target phone line is busy. In the present embodiment, information elements for controlling the tone are included in the INFO message, and by linking with the SIP terminal capable of recognizing the INFO message, tone control from the IP-PBX 1, which has been impossible in the conventional SIP terminal, is possible.

Figure 10:
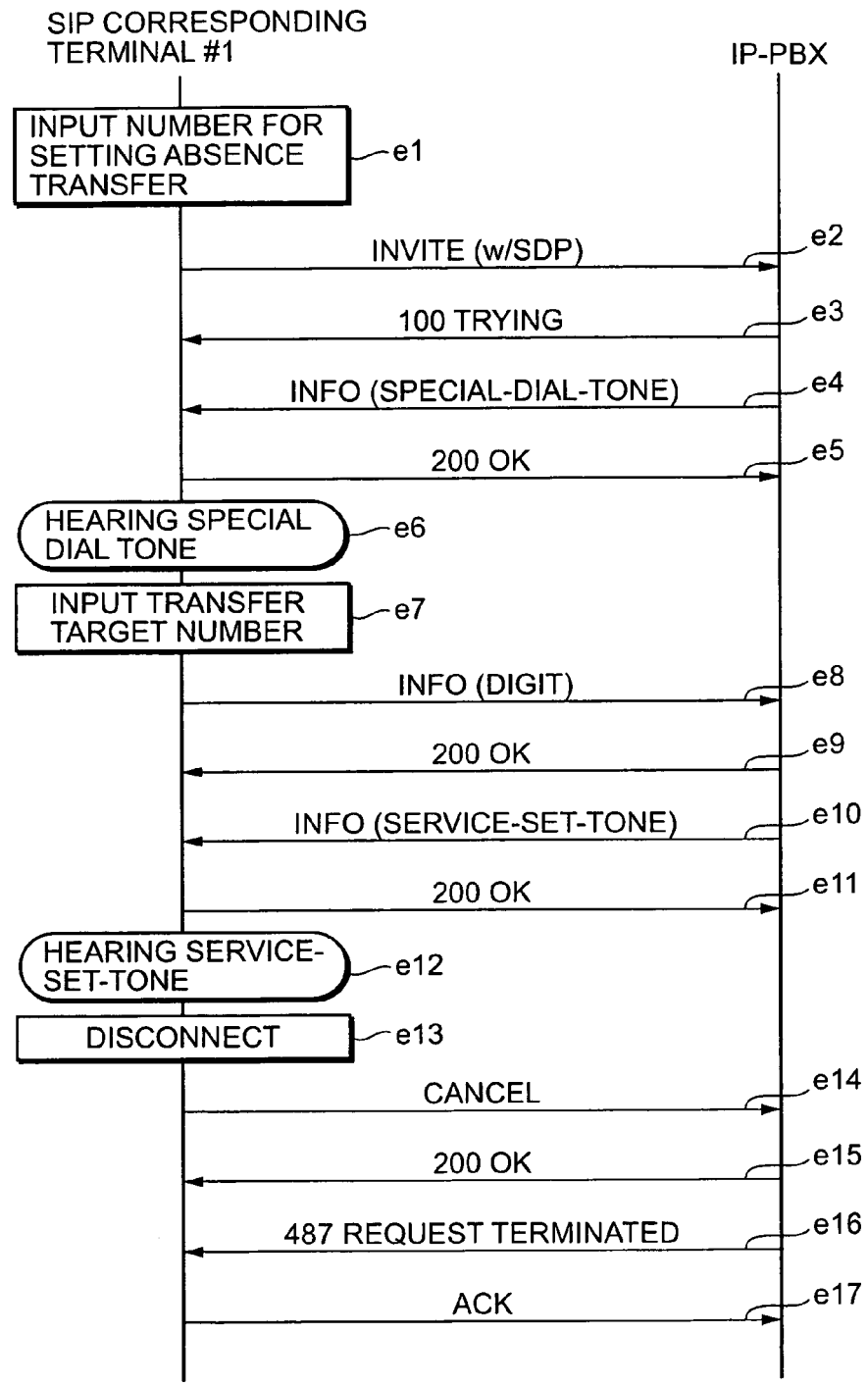
FIG. 10 is a sequence chart showing an absence transfer setting process according to one embodiment of the present invention.

FIG. 10 is a sequence chart showing an absence transfer setting process according to one embodiment of the present invention. In FIG. 10, in the present embodiment, for example, the SIP terminal sets absence transfer which is the service of the IP-PBX 1. In this case, the user is allowed to hear a service set tone for notifying that the service has been normally set.

Since the tone cannot be heard in the conventional SIP terminal, there has not been any method of knowing that the above-described absence transfer setting service has been normally set, but in the present embodiment, the tone can be heard by the SIP terminal capable of recognizing the INFO message, and it can be known that the service has been normally set.

To set the absence transfer, when a number for setting the absence transfer is input (e1 of FIG. 10), the SIP corresponding terminal #1 sends "INFO (w/SDP)" to the IP-PBX 1 (e2 of FIG. 10). The IP-PBX 1 returns "100 Trying" to the SIP corresponding terminal #1 (e3 of FIG. 10), and also sends "INFO (Special-Dial-Tone)" to the SIP corresponding terminal #1 (e4 of FIG. 10).

The SIP corresponding terminal #1 returns "200 OK" to the IP-PBX 1 (e5 of FIG. 10), and a special dial tone is being heard (e6 of FIG. 10). Subsequently, when a transfer target number is input (e7 of FIG. 10), the SIP corresponding terminal #1 sends "INFO (DIGIT)" to the IP-PBX 1 (e8 of FIG. 10).

The IP-PBX 1 returns "200 OK" to the SIP corresponding terminal #1 (e9 of FIG. 10), and sends "INFO (Service-Set-Tone)" to the SIP corresponding terminal #1 (e10 of FIG. 10). The SIP corresponding terminal #1 returns "200 OK" to the IP-PBX 1 (e11 of FIG. 10), and a service set tone is being heard (e12 of FIG. 10).

Thereafter, when the SIP corresponding terminal #1 is disconnected (e13 of FIG. 10), the terminal sends "CANCEL" to the IP-PBX 1 (e14 of FIG. 10). The IP-PBX 1 returns "200 OK" to the SIP corresponding terminal #1 (e15 of FIG. 10), and sends "487 Request Terminated" to the SIP corresponding terminal #1 (e16 of FIG. 10). On the other hand, the SIP corresponding terminal #1 returns "ACK" to the IP-PBX 1 (e17 of FIG. 10).

As described above, in the present embodiment, the tone control is performed with respect to the SIP terminal. Accordingly, the user who operates the SIP terminal hears the tone from the SIP terminal, and can accordingly recognize a service state. Therefore, the SIP terminal itself can use various services of the IP-PBX without being conscious of the service.

Thus, in the present invention, the client terminal conforming to the SIP can be incorporated in the service of the IP-PBX 1, and free mutual connection to the terminal corresponding to various protocols supported by the existing IP-PBX 1 is provided with respect to the SIP client terminal, and great variety of additional services of the existing IP-PBX 1 can be provided. It is to be noted that the above-described processes shown in FIGS. 5 to 10 are realized by the processes in the PBX additional service providing module 11, PBX basic connection process providing module 12, and tone control module 13.

Here, in FIGS. 5 to 10, "INVITE" is a method for use in establishing a session between participants, "100 Trying" indicates that a trial is being performed, "INFO" is a method for use in notifying the information, "180 Ringing" indicates the ringing, "200 OK" indicates that the response is successful, "ACK" indicates a method for use in permitting the establishment of the session, and "PRACK" indicates a method for supporting secure transmission of a transitional response. "BYE" indicates a method for ending the session, "CANCEL" indicates a method for use in canceling the session, and 487 Request Terminated" indicates that the request has been terminated.

Figure 11:
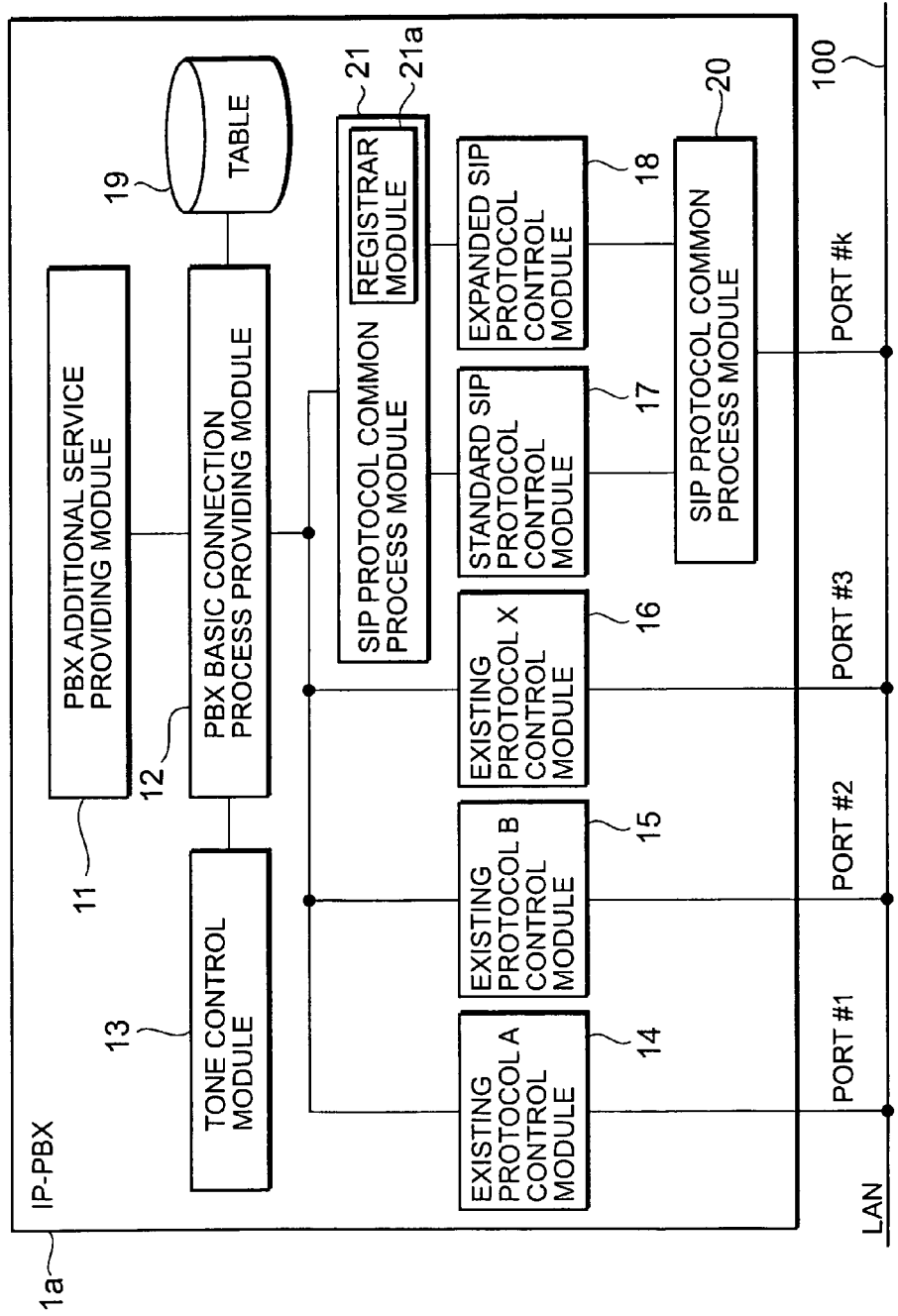
FIG. 11 is a block diagram showing a constitution of the IP-PBX according to another embodiment of the present invention.
Figure 12:
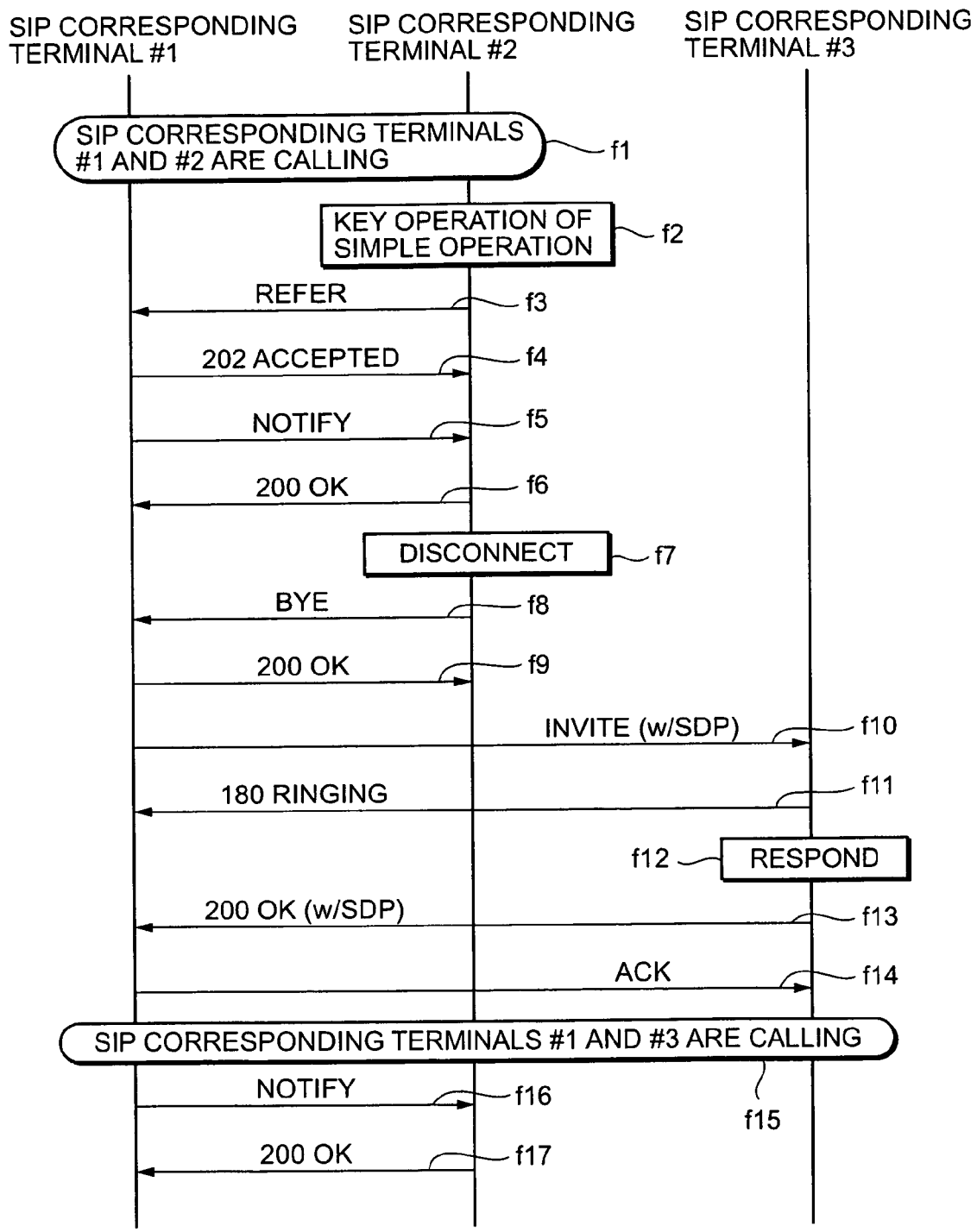
FIG. 12 is a sequence chart showing a process in a case where the simple operation is used as a conventional transfer service.
Figure 13:
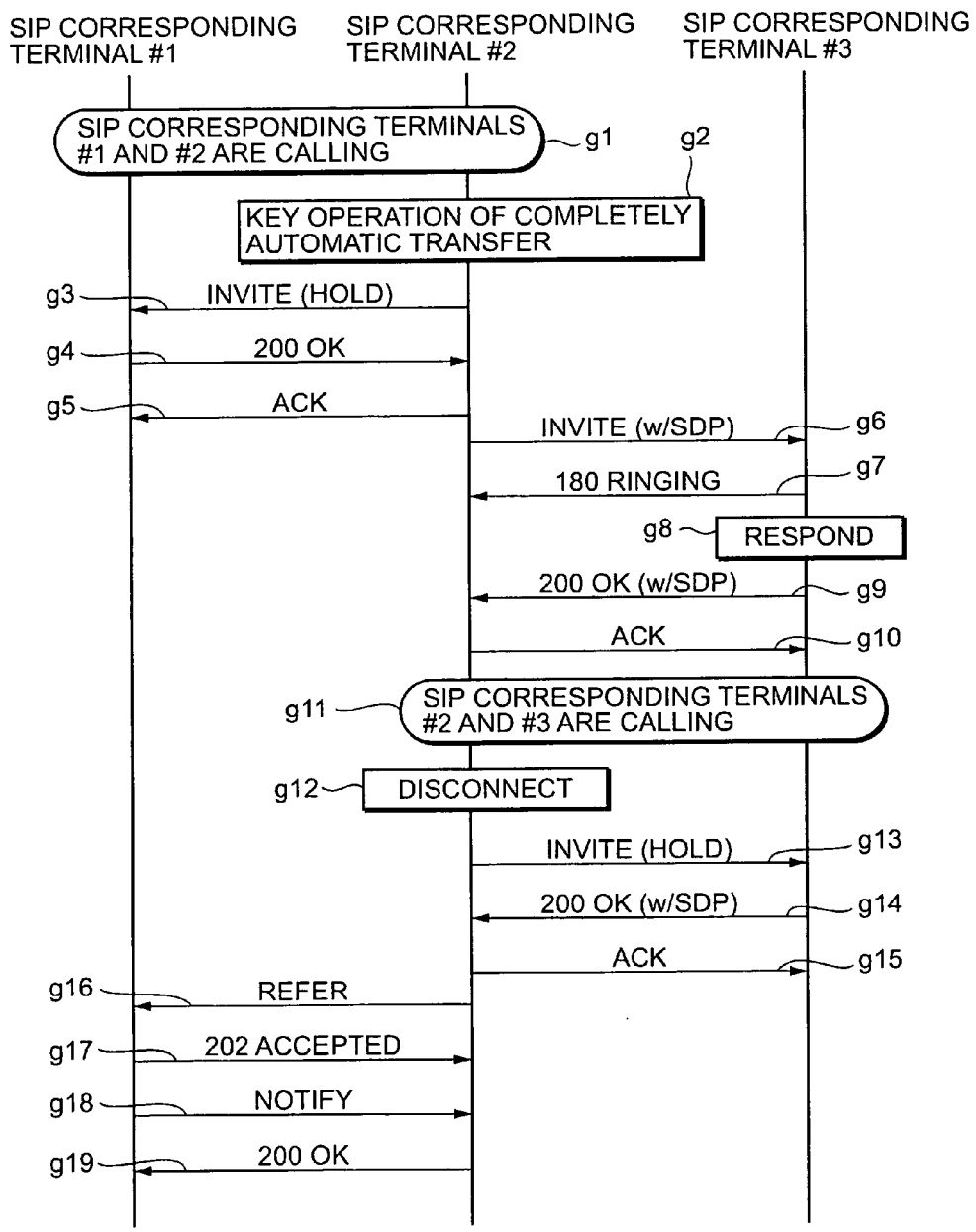
FIG. 13 is a sequence chart showing a process in a case where the completely automatic transfer is performed as the conventional transfer service.
Figure 14:
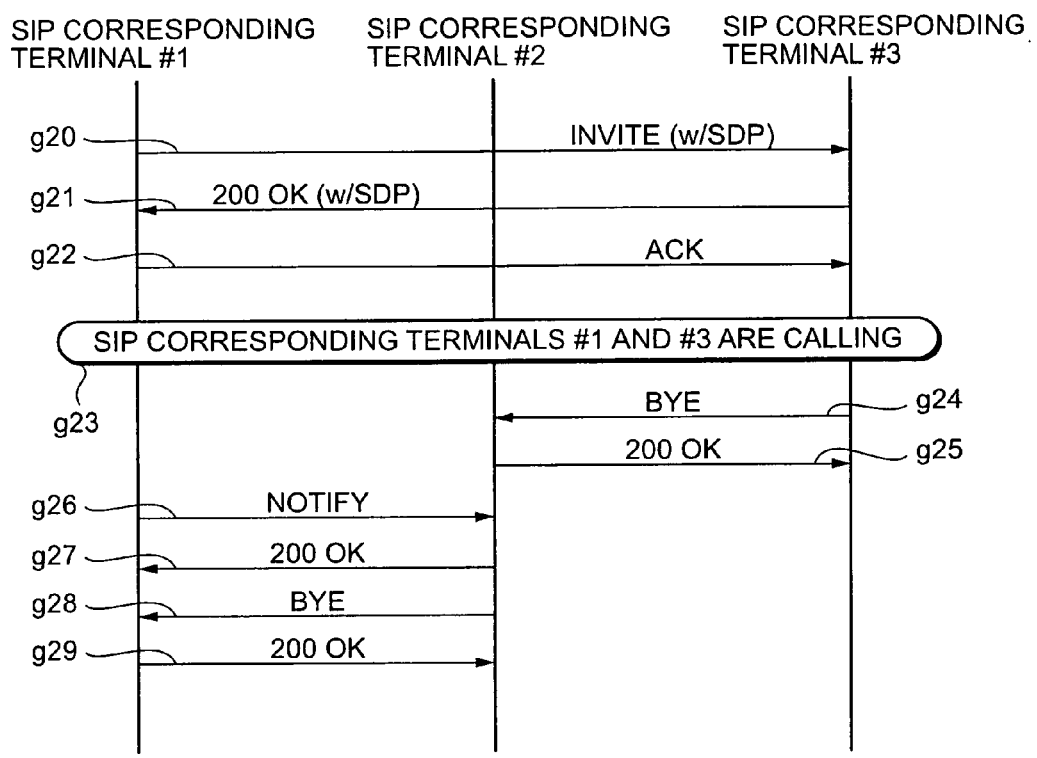
FIG. 14 is a sequence chart showing a process in a case where the completely automatic transfer is performed as the conventional transfer service.

FIG. 11 is a block diagram showing a constitution of the IP-PBX according to another embodiment of the present invention. In FIG. 11, an IP-PBX 1a according to the other embodiment of the present invention has a constitution similar to that of the IP-PBX 1 according to one embodiment of the present invention shown in FIG. 2 except that a common process in the standard SIP protocol control module 17 and the expanded SIP protocol control module 18 is constituted into modules, that is, SIP system protocol common process modules 20, 21 are disposed. The same constituting elements are denoted with the same reference numerals.

Additionally, the standard SIP protocol control module 17 and the expanded SIP protocol control module 18 are constituted into modules while saving the common process. For example, an SIP system protocol register module 21a for registering contact information is disposed.

It is to be noted that in the present embodiment, the SIP system protocol common process modules 20, 21 are disposed on a LAN 100 side and a PBX basic connection process providing module 12 side, respectively, with respect to the standard SIP protocol control module 17 and the expanded SIP protocol control module 18, and they can be realized by one module.

Moreover, in the above-described one embodiment of the present invention, ports #4, #5 are assigned to the standard SIP protocol control module 17 and the expanded SIP protocol control module 18, respectively, but in the present embodiment, a common port #k is assigned to the SIP system protocol common process module 20.

As described above, in the present embodiment, tone control is performed with respect to an SIP terminal. Accordingly, a user who hears a tone from the SIP terminal to thereby operate the SIP terminal can recognize a service state. Therefore, the SIP terminal itself can use various services of the IP-PBX without being conscious of any service.

Thus, in the present invention, the client terminal conforming to the SIP can be incorporated in the service of the IP-PBX 1, and free mutual connection to the terminal corresponding to various protocols supported by the existing IP-PBX 1 is provided with respect to the SIP client terminal, and great variety of additional services of the existing IP-PBX 1 can be provided. It is to be noted that the above-described processes shown in FIGS. 5 to 10 are realized by the processes in the PBX additional service providing module 11, PBX basic connection process providing module 12, and tone control module 13.

As described above, the present invention is applicable to not only the providing of the service of the private branch exchange with respect to the SIP terminal in a network such as LAN but also a call connection process via an external IP network such as Internet. The present invention is also applicable to IP centrex which provides PBX function via IP network.

What is claimed is:

1. A network including: at least a session initiation protocol (SIP) terminal which performs communication by an SIP for realizing connection type communication to perform the communication while confirming connection to a target in an Internet protocol (IP) network; and a private branch exchange which performs a call connection process between the terminals, the network comprising:

an SIP system protocol control module incorporated as one of component groups of the private branch exchange and constituted into the module using a mechanism of a back to back user agent (B2BUA) which operates as an acting user agent of a process of the SIP; and an additional service providing module which is incorporated as one of the component groups of the private branch exchange and which provides additional services of the private branch exchange in response to a key operation of the SIP terminal, the key operation causing an output of a hooking operation or a tone indication, wherein no software change is required for the SIP terminal in order to utilize the additional services on the network.

2. The network according to claim 1, wherein the SIP is a communication protocol for use in starting or ending a multimedia communication using data in the form of an IP packet, and wherein information corresponds to the additional services is provided by way of an SIP INFO message that is received and decoded by the SIP terminal, without requiring a software upgrade of the SIP terminal.

3. The network according to claim 2, wherein the SIP system protocol control module is disposed for a plurality of SIP terminals having different protocols.

4. The network according to claim 1, wherein the private branch exchange provides at least mutual connection and additional service to each protocol group constituted into the module.

5. The network according to claim 1, wherein the key operation includes at least a hooking operation and tone indication in the SIP terminal.

6. The network according to claim 1, wherein the additional service of the private branch exchange includes at least a transfer method in which a transferor resets before a transfer target makes a response, a transfer method in which the transferor resets after the transfer target makes the response, and tone control with respect to the SIP terminal.

7. A private branch exchange which performs a call connection process between terminals, comprising:
   an SIP system protocol control module that includes a back to back user agent (B2BUA) operating as an acting user agent of a process of a session initiation protocol (SIP) for realizing connection type communication while confirming connection to a target in an Internet protocol (IP) network, and
   an additional service providing module for providing an additional service in response to a key operation of an SIP terminal, the key operation causing an output of a hooking operation or a tone indication with respect to the SIP terminal,
   wherein no software change is required for the SIP terminal in order to utilize the additional services on the network.

8. The private branch exchange according to claim 7, wherein the SIP is a communication protocol for use in starting or ending a multimedia communication using data in the form of an IP packet, and wherein information corresponds to the additional services is provided by way of an SIP INFO message that is received and decoded by the SIP terminal, without requiring a software upgrade of the SIP terminal.

9. The private branch exchange according to claim 7, wherein the SIP system protocol control module is disposed for a plurality of SIP terminals having different protocols.

10. The private branch exchange according to claim 7, which provides at least one of mutual connection and additional service to each protocol group constituted into the module.

11. The private branch exchange according to claim 7, wherein the additional service includes at least a transfer method in which a transferor resets before a transfer target makes a response, a transfer method in which the transferor resets after the transfer target makes the response, and tone control with respect to the SIP terminal.

12. A PBX additional service starting method of a network including: at least a session initiation protocol (SIP) terminal which performs communication by an SIP for realizing connection type communication to perform the communication while confirming connection to a target in an Internet protocol (IP) network; and a private branch exchange which performs a call connection process between the terminals, the method comprising the steps of:
   incorporating an SIP system protocol control module constituted into the module using a mechanism of a back to back user agent (B2BUA) which operates as an acting user agent, and an additional service providing module as one of the component groups of the private branch exchange; and
   allowing the SIP system protocol control module to perform a process of the SIP, and allowing the additional service providing module to provide an additional service of the private branch exchange in response to a key operation of the SIP terminal, the key operation causing an output of a hooking operation or a tone indication, wherein no software change is required for the SIP terminal in order to utilize the additional services on the network.

13. The PBX additional service starting method according to claim 12, wherein the SIP is a communication protocol for use in starting or ending a multimedia communication using data in the form of an IP packet, and wherein information corresponds to the additional services is provided by way of an SIP INFO message that is received and decoded by the SIP terminal, without requiring a software upgrade of the SIP terminal.

14. The PBX additional service starting method according to claim 12, wherein the SIP system protocol control module is disposed for a plurality of SIP terminals having different protocols.

15. The PBX additional service starting method according to claim 12, wherein the private branch exchange provides at least one of mutual connection and additional service to each protocol group constituted into the module.

16. The PBX additional service starting method according to claim 12, wherein the key operation includes at least a hooking operation and tone indication in the SIP terminal.

17. The PBX additional service starting method according to claim 12, wherein the additional service of the private branch exchange includes at least a transfer method in which a transferor resets before a transfer target makes a response, a transfer method in which the transferor resets after the transfer target makes the response, and tone control with respect to the SIP terminal.

* * * * *

UNITED STATES PATENT AND TRADEMARK OFFICE
CERTIFICATE OF CORRECTION

| | | |
|---|---|---|
| PATENT NO. | : 7,496,089 B2 | Page 1 of 1 |
| APPLICATION NO. | : 10/968151 | |
| DATED | : February 24, 2009 | |
| INVENTOR(S) | : Hiroshima et al. | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 679 days Delete the phrase "by 679 days" and insert -- by 1162 days --

Signed and Sealed this

Twenty-third Day of March, 2010

David J. Kappos
*Director of the United States Patent and Trademark Office*